(12) United States Patent
Liang et al.

(10) Patent No.: US 11,828,911 B1
(45) Date of Patent: Nov. 28, 2023

(54) METAMATERIAL ABSORBER INTEGRATED LONG-WAVE INFRARED FOCAL PLANE ARRAY (LWIRFPA)

(71) Applicant: NORTHEAST NORMAL UNIVERSITY, Changchun (CN)

(72) Inventors: Zhongzhu Liang, Changchun (CN); Zheng Qin, Changchun (CN); Haiyang Xu, Changchun (CN); Fuming Yang, Changchun (CN); Dejia Meng, Changchun (CN); Enzhu Hou, Changchun (CN); Jiangang Ma, Changchun (CN); Yichun Liu, Changchun (CN)

(73) Assignee: Northeast Normal University, Changchun (CN)

( * ) Notice: Subject to any disclaimer, the term of this patent is extended or adjusted under 35 U.S.C. 154(b) by 0 days.

(21) Appl. No.: 17/982,796

(22) Filed: Nov. 8, 2022

(51) Int. Cl.
*G02B 1/00* (2006.01)
*G02B 5/00* (2006.01)

(52) U.S. Cl.
CPC ............ *G02B 1/002* (2013.01); *G02B 5/003* (2013.01); *G02B 5/008* (2013.01)

(58) Field of Classification Search
CPC ......... G02B 1/002; G02B 5/003; G02B 5/008
USPC ................................................. 356/445, 448
See application file for complete search history.

(56) References Cited

U.S. PATENT DOCUMENTS

| | | | | |
|---|---|---|---|---|
| 9,482,798 B2* | 11/2016 | Lee | ............................ | G02B 5/26 |
| 9,513,226 B2* | 12/2016 | Pang | ..................... | G01N 21/658 |
| 10,101,212 B1* | 10/2018 | Cleary | ....................... | G01J 5/10 |
| 2003/0164947 A1* | 9/2003 | Vaupel | ................. | G01N 21/211 |
| | | | | 356/445 |
| 2006/0274315 A1* | 12/2006 | Saito | ..................... | G01N 21/554 |
| | | | | 356/445 |
| 2008/0316490 A1* | 12/2008 | Yen | ..................... | G01N 21/7743 |
| | | | | 356/445 |
| 2012/0257204 A1* | 10/2012 | Walters | ................ | C12Q 1/6837 |
| | | | | 438/66 |
| 2013/0003058 A1* | 1/2013 | Van Dorpe | ............ | B82Y 15/00 |
| | | | | 977/773 |
| 2013/0092211 A1* | 4/2013 | Collin | ..................... | G02B 5/003 |
| | | | | 136/246 |
| 2014/0268332 A1* | 9/2014 | Guo | ........................ | G02B 5/008 |
| | | | | 359/885 |
| 2015/0369735 A1* | 12/2015 | Avouris | ................ | H01L 21/042 |
| | | | | 438/49 |

(Continued)

*Primary Examiner* — Isiaka O Akanbi
(74) *Attorney, Agent, or Firm* — Kirk A. Wilson; Joseph T. Guy; Patent Filing Specialist Inc.

(57) ABSTRACT

The present disclosure provides a metamaterial absorber integrated long-wave infrared focal plane array (LWIRFPA), including: a resonator layer, a dielectric layer, and a metal layer. The resonator layer is of a sub-wavelength periodic resonator array structure, generates surface plasmon resonance (SPR), and is made of a metal or metalloid material. The SPR refers to propagating surface plasmon resonance (PSPR) or localized surface plasmon resonance (LSPR). By using corresponding shape and structural size of a resonator, the present disclosure achieves broadband absorption, narrow-band absorption, multi-wavelength absorption, polarization-selective absorption, etc. By integrating the metamaterial absorber on the IRFPA, not only can the absorptivity be improved, but also more functions can be achieved by the IRFPA.

9 Claims, 11 Drawing Sheets

(56) References Cited

U.S. PATENT DOCUMENTS

2017/0219746 A1* 8/2017 Nagao ...................... C23F 1/02

* cited by examiner

METAMATERIAL ABSORBER INTEGRATED LONG-WAVE INFRARED FOCAL PLANE ARRAY (LWIRFPA)

TECHNICAL FIELD

The present disclosure relates to the field of uncooled infrared (IR) imaging, and in particular to a metamaterial absorber integrated long-wave infrared focal plane array (LWIRFPA).

BACKGROUND

Without a cooling system, the uncooled IR detection is intended to sense incident IR radiation and convert it into an electrical output signal. This technology has been widely applied to such fields as military, industry, health care, scientific research and environmental monitoring. As the most widely used uncooled IR detection technology, a micro-bolometer has the characteristics of low cost, low power consumption, quick response, etc. When the micro-bolometer works, the resistance of a thermosensitive material changes correspondingly with a temperature due to incident light. During working, the thermosensitive material is applied at is two ends with a bias voltage, so that the resistance change is converted into an electrical output signal, to realize IR detection. Hence, the sensitivity and detection waveband of the micro-bolometer depend on an absorption wavelength. However, the thermistor made of vanadium oxide, amorphous silicon and so on has a low absorptivity in the LWIR band and a high reflectivity on the surface. It is a common practice to obtain the high absorptivity by integrating a silicon nitride absorber layer on the thermistor layer. Nevertheless, beyond an intrinsic absorption band of the silicon nitride absorber layer, the absorptivity is still low and is hardly improved.

As shown in FIG. 1, a conventional FPA structure is generally composed of an absorber layer (the conventional FPA structure is not provided with a resonator), a thermistor layer, a support layer, and a metal reflective layer under a quarter-wave air cavity. Due to a low absorptivity of the thermistor in the IR band, thick silicon nitride is used as the absorber layer. For the sake of the high absorptivity, the quarter-wave air cavity and the metal reflective layer thereunder are further formed into a resonant cavity. With a thickness of at least 2 μm, the resonant cavity is hardly prepared and has the poor mechanical strength. On the other hand, the intrinsic absorption peak of the silicon nitride is in a range between 10 μm and 12 μm, beyond which the absorptivity is reduced quickly. Therefore, the detection wavelength of the conventional FPA is restricted. To perfectly solve the above-mentioned two problems, the present disclosure provides a metamaterial absorber integrated IRFPA structure.

SUMMARY

In view of the above-mentioned problems, an objective of the present disclosure is to provide a metamaterial absorber integrated LWIRFPA.

The metamaterial absorber integrated LWIRFPA includes: a resonator layer, a dielectric layer, a metal layer, an insulating layer, a thermistor layer, a support layer, and metal reflective layer, where the resonator layer is of a sub-wavelength periodic resonator array structure, generates surface plasmon resonance (SPR), and is made of a metal or metalloid material.

The SPR refers to propagating surface plasmon resonance (PSPR) or localized surface plasmon resonance (LSPR);

the two types of SPR may achieve perfect absorption, but have different geometric parameter control methods; and the PSPR is controlled by a structure period, with a change rule satisfying:

$$k_{SP} = k_0 \sin\theta + i \times \frac{2\pi}{P}$$

where $$k_{SP} = \frac{2\pi}{\lambda},$$

namely $\lambda \propto P$, wavelength of the PSPR increases a red shift with the structure period;

The LSPR may be explained with an equivalent circuit model: $\lambda = 2\pi\sqrt{LC/2} \propto w$, where $\lambda$ is a wavelength of the LSPR, L and C respectively represent an equivalent inductance and an equivalent capacitance of a metamaterial absorber, and w represents an effective length of a resonator; and the wavelength of the LSPR is positively correlated with the effective length of the resonator.

The resonator layer is composed of a surface graphical sub-wavelength periodic metal resonator array.

The dielectric layer is a thermistor layer or a support layer.

The metamaterial absorber integrated LWIRFPA further includes: a thermistor layer.

According to the metamaterial absorber integrated LWIRFPA, an absorber layer is provided on the thermistor layer.

An air cavity is further provided under the metamaterial absorber integrated LWIRFPA.

A metal reflective layer is provided under the air cavity.

From top to bottom, the metamaterial absorber integrated LWIRFPA sequentially includes: a cross-shaped titanium resonator layer, a germanium dielectric layer, a titanium metal layer, a silicon nitride insulating layer, an amorphous silicon thermistor layer, and a silicon nitride support layer; the resonator layer is 20-1,000 nm thick, the germanium dielectric layer is 10-1,000 nm thick, the titanium metal layer is 10-1,500 nm thick, the silicon nitride insulating layer is 10-100 nm thick, the amorphous silicon thermistor layer is 10-800 nm thick, and the silicon nitride support layer is 10-1,000 nm thick; and a cross-shaped titanium resonator has a period of 0.8-4.4 a length of 0.5-2.5 and a width of 0.05-1 μm.

From top to bottom, the metamaterial absorber integrated LWIRFPA sequentially includes: a cross-shaped titanium resonator layer, a silicon nitride insulating layer, an amorphous silicon thermistor layer, a silicon nitride insulating layer, a titanium metal layer, and a silicon nitride support layer; the cross-shaped titanium resonator layer is 50-200 nm thick, the silicon nitride insulating layer is 80-150 nm thick, the amorphous silicon thermistor layer is 60-100 nm thick, the silicon nitride insulating layer is 10-50 nm thick, the titanium metal layer is 10-50 nm thick, and the silicon nitride support layer is 100-200 nm thick; and a cross-shaped titanium resonator has a period of 0.8-3 a length of 1-2 and a width of 0.1-1 μm.

From top to bottom, the metamaterial absorber integrated LWIRFPA sequentially includes: an amorphous silicon thermistor layer, a silicon nitride insulating layer, a circular titanium resonator layer, a silicon nitride/germanium compound dielectric layer, and an aluminum metal layer; the amorphous silicon thermistor layer is 60-100 nm thick, the silicon nitride insulating layer is 10-50 nm thick, the titanium resonator layer is 50-80 nm thick, the silicon nitride/germanium dielectric layer is 100-600 nm thick, and the aluminum metal layer is 10-50 nm thick; and a circular titanium resonator has a period of 1.2-4 and a diameter of 0.4-3 μm.

Firstly, the conventional FPA can only achieve high absorption at an intrinsic absorption wavelength of the material of the absorber layer, while the metamaterial absorber integrated FPA can achieve complete absorption in a broadband spectrum. Therefore, the detection performance of the FPA is improved greatly.

Secondly, the metamaterial absorber integrated FPA can achieve perfect absorption only through the absorber structure. The support leg (air cavity) does not need to satisfy a quarter-wave height, and can use a smaller height to obtain higher mechanical stability.

Thirdly, by designing geometric parameters of the resonator, the metamaterial absorber integrated FPA can achieve wavelength-selective absorption, polarization-selective absorption, narrow-band absorption, multi-peak absorption and so on, which can only be achieved for the conventional FPA by configuring a polarizer or a filter. Therefore, the metamaterial absorber integrated FPA can greatly simplify the complexity of the system, and achieve the better detection function.

The present disclosure provides the metamaterial absorber integrated LWIRFPA, including: a resonator layer, a dielectric layer, a metal layer, an insulating layer, a thermistor layer, a support layer, and metal reflective layer. The resonator layer is of a sub-wavelength periodic resonator array structure, generates SPR, and is made of a metal or metalloid material. The SPR refers to PSPR or LSPR. By using corresponding shape and structural size of a resonator, the present disclosure achieves broadband absorption, narrow-band absorption, multi-wavelength absorption, polarization-selective absorption, etc. By integrating the metamaterial absorber on the IRFPA, not only can the absorptivity be improved, but also more functions can be achieved by the IRFPA.

DETAILED DESCRIPTION OF THE EMBODIMENTS

Embodiment 1 Metamaterial absorber (metamaterial absorber integrated LWIRFPA)

From top to bottom, the metamaterial absorber structure includes: a resonator layer composed of a resonator array, a dielectric layer, and a metal layer.

The resonator layer is made of a metal or metalloid material, and is of a surface graphical sub-wavelength periodic structure.

That is, the metamaterial absorber is of a three-layer metal-dielectric-metal (MDM) structure composed of a surface graphical sub-wavelength periodic metal resonator array, which can achieve perfect absorption at a special band.

Generally, the metal material of the resonator layer can be selected from titanium, aluminum, copper, gold, silver, platinum, nickel, etc.

The thickness of the metamaterial absorber is only one or several tenths of a working wavelength. The surface graphical sub-wavelength periodic metal resonator can be coupled with incident light of a special wavelength to excite SPR. As a result, the incident light is restricted in a sub-wavelength scale, and energy of the incident light is converted into heat energy in form of an ohmic loss or a dielectric loss of the metal.

The working wavelength and absorption performance of the metamaterial absorber can be adjusted through geometric parameters of the resonator. Consequently, with appropriate shape and structural size of the resonator, functions such as the broadband absorption, narrow-band absorption, multi-wavelength absorption, and polarization-selective absorption can be achieved. By integrating the metamaterial absorber to the IRFPA, not only the absorptivity be improved, but also more functions can be achieved by the IRFPA.

According to different integrated mode, three structures can be obtained by integrating the metamaterial absorber to the IRFPA. Specifically, the metamaterial absorber is directly integrated on the thermistor layer plated with the insulating layer;

the thermistor layer serves as a dielectric layer of the metamaterial absorber; and the thermistor layer is integrated at the top of the metamaterial absorber;

The following description is made with reference to drawings

Embodiment 2 Metamaterial absorber integrated LWIRFPA

Figure 3:
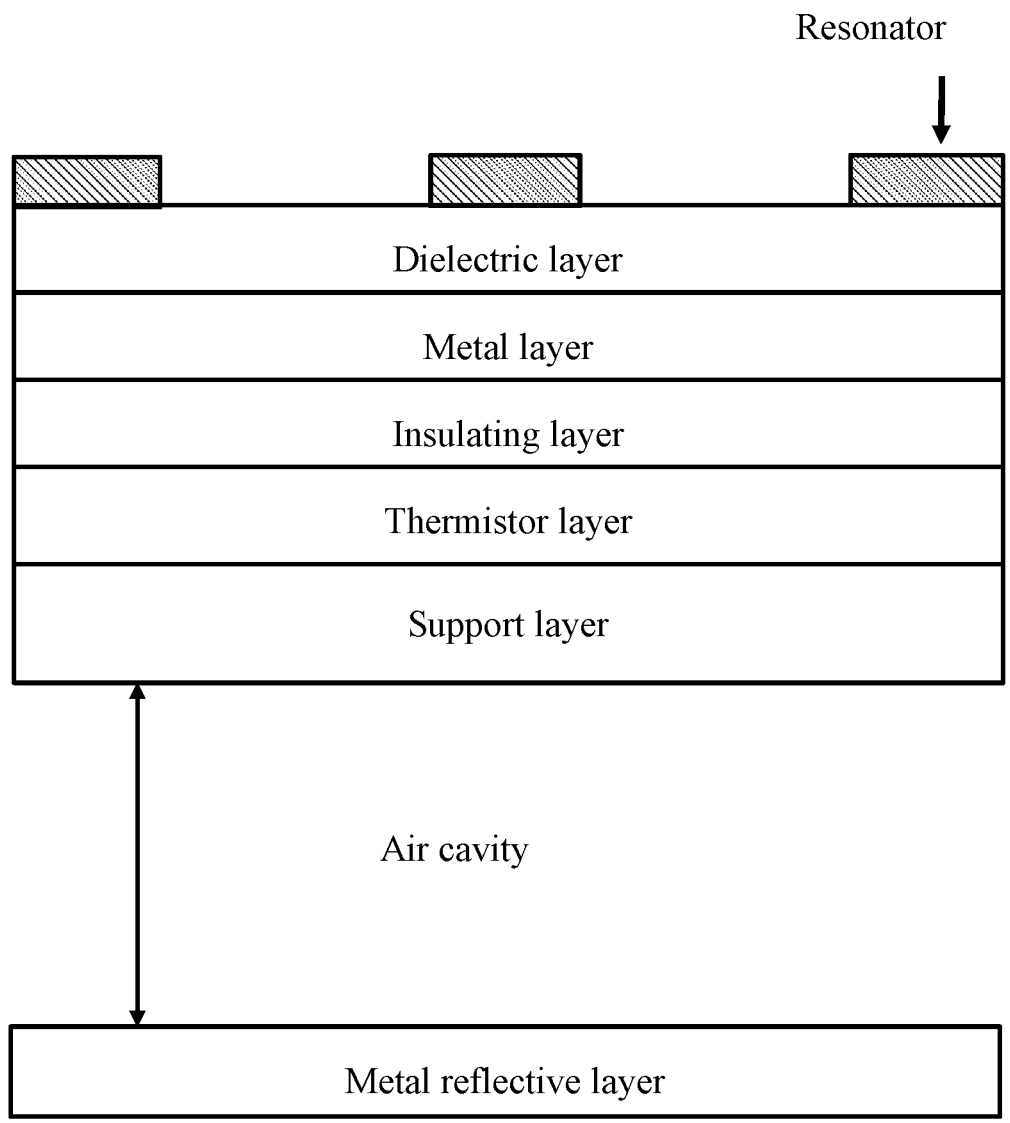
FIG. 3 is a schematic structural view illustrating an FPA in which a metamaterial absorber is directly integrated on a thermistor layer plated with an insulating layer according to the present disclosure.

FIG. 3 shows an LWIRFPA in which a metamaterial absorber is directly integrated on a thermistor layer plated with an insulating layer. From top to bottom, the metamaterial absorber integrated LWIRFPA sequentially includes: a resonator layer, a dielectric layer, a metal layer, an insulating layer, a thermistor layer, a support layer, an air cavity, and a metal reflective layer.

The metamaterial absorber integrated LWIRFPA is obtained by removing an original absorber layer of the FPA and directly integrating a metamaterial absorber on the FPA.

IR radiation incident on the FPA is directly absorbed by the absorber structure. IR radiation in a broadband is completely absorbed by the absorber structure, and converted into heat energy. The heat energy is conducted to the thermistor layer through the electrical insulating layer, and is finally converted into an electrical signal for readout. Since incident light is directly absorbed by the uppermost absorber structure, and is unnecessarily reflected by the air cavity, the metal reflective layer on a readout circuit board can also be removed.

Embodiment 3 Metamaterial absorber integrated LWIRFPA

Figure 4:
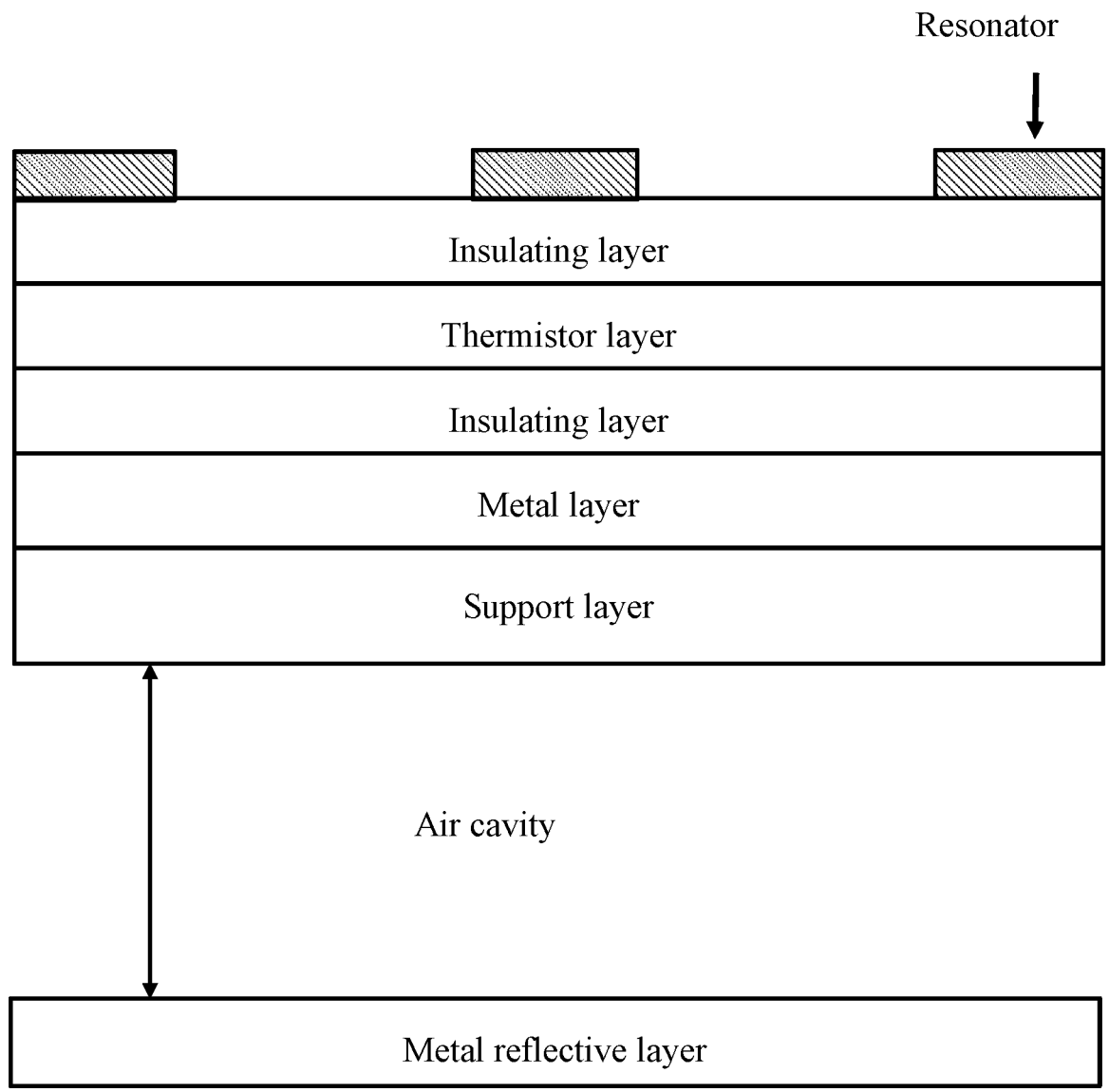
FIG. 4 is a schematic structural view illustrating an FPA in which a thermistor layer serves as a dielectric layer of a metamaterial absorber structure according to the present disclosure.

FIG. 4 shows an LWIRFPA in which a thermistor layer serves as a dielectric layer of a metamaterial absorber structure. From top to bottom, the metamaterial absorber integrated LWIRFPA sequentially includes: a resonator layer, an insulating layer, a thermistor layer, an insulating layer, a metal layer, a support layer, an air cavity, and a metal reflective layer.

According to the metamaterial absorber integrated LWIRFPA, the resonator layer, the two insulating layers, the thermistor layer and the metal layer thereunder are formed into a metamaterial absorber.

According to the technical solution in the embodiment, the resonator and the metal layer can be made of low-loss metal, such that heat energy into which incident light is converted is concentrated in the thermistor layer. When IR radiation is incident on the FPA, the IR radiation is coupled to the resonator to excite SPR, such that an incident magnetic field is concentrated in the thermistor layer and is directly converted into heat energy in the thermistor layer. Without being conducted by other structures, energy of the incident light is absorbed by the thermistor layer to the utmost extent, and thus the detection performance can be effectively improved.

Embodiment 4 Metamaterial absorber integrated LWIRFPA

Figure 5:
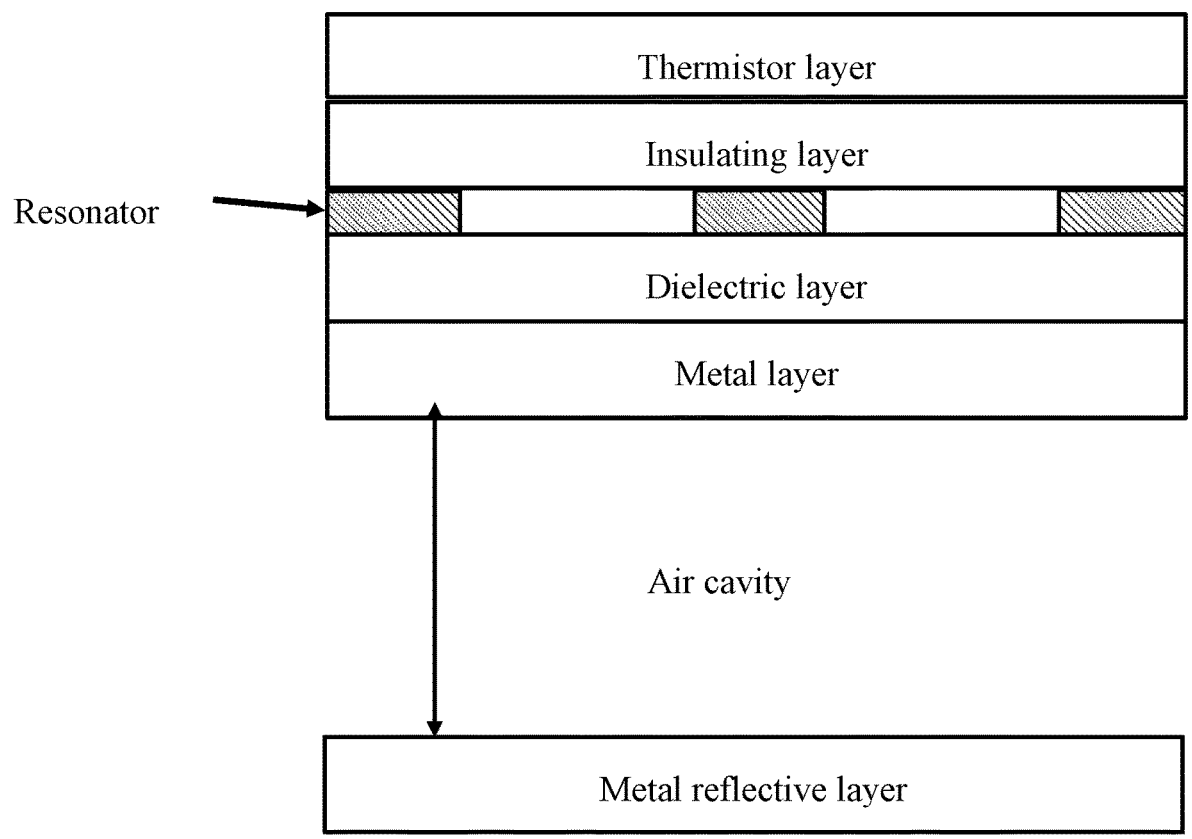
FIG. 5 is a schematic structural view illustrating an FPA in which a thermistor layer is integrated on a metamaterial absorber structure according to the present disclosure.

FIG. 5 shows an LWIRFPA in which a thermistor layer is integrated on a metamaterial absorber structure. From top to bottom, the metamaterial absorber integrated LWIRFPA sequentially includes: a thermistor layer, an insulating layer, a resonator layer, a dielectric layer, and a metal layer.

The metamaterial absorber integrated LWIRFPA is obtained by removing original absorber layer and support layer, and integrating the thermistor layer on the metamaterial absorber structure. The original support layer serves as the dielectric layer of the metamaterial absorber. The metamaterial absorber and the insulating layer thereon serve as the support layer of the FPA.

Incident IR radiation is transmitted to a surface of a resonator of the metamaterial absorber through the thermistor layer and the insulating layer to excite SPR and is completely absorbed by the metamaterial absorber. By selecting the metal layer with a small loss and the resonator layer with a high loss, incident light is intensively converted into heat energy in the resonator layer, and the heat energy is quickly conducted to the thermistor layer through the insulating layer. Meanwhile, the FPA obtained with the solution has a small thickness.

Embodiment 5 Geometric parameter control of resonator array

The geometric parameter control of the resonator array is to control an SPR wavelength and a responsive bandwidth through the resonator array, namely the SPR wavelength and the responsive bandwidth are controlled by geometric parameters of the resonator array. Therefore, by selecting appropriate shape and size of the resonator, characteristics such as perfect absorption, broadband absorption, polarization-selective absorption, and polarization-insensitive absorption in a target band can be achieved. For a specific resonator structure, two types of SPR, including PSPR and LSPR, can be excited. The two types of SPR can achieve perfect absorption, but have different geometric parameter control methods. The PSPR is controlled by a structure period, with a change rule satisfying:

$$k_{SP} = k_0 \sin\theta + i \times \frac{2\pi}{P}$$

$$k_{SP} = \frac{2\pi}{\lambda},$$

namely $\lambda \propto P$. A wavelength of the PSPR increases a red shift with the structure period.

Figure 1:
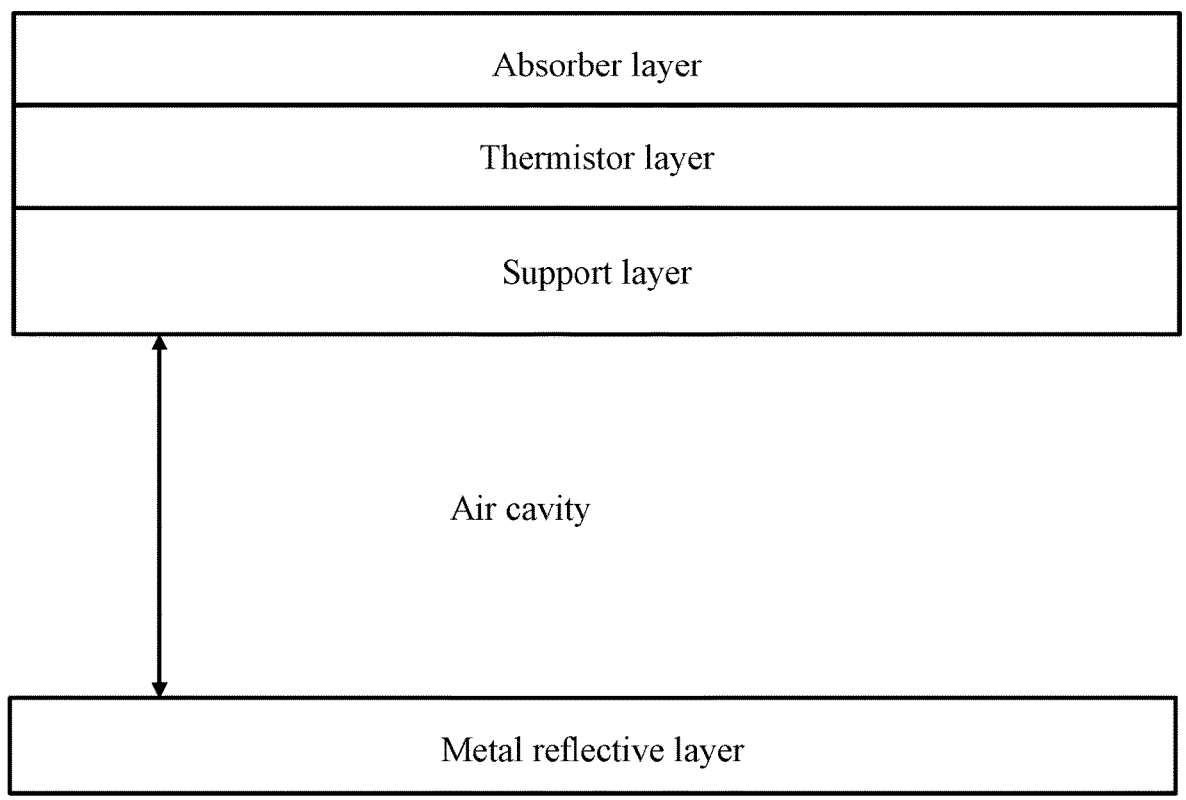
FIG. 1 is a schematic structural view of an existing FPA.
Figure 2:
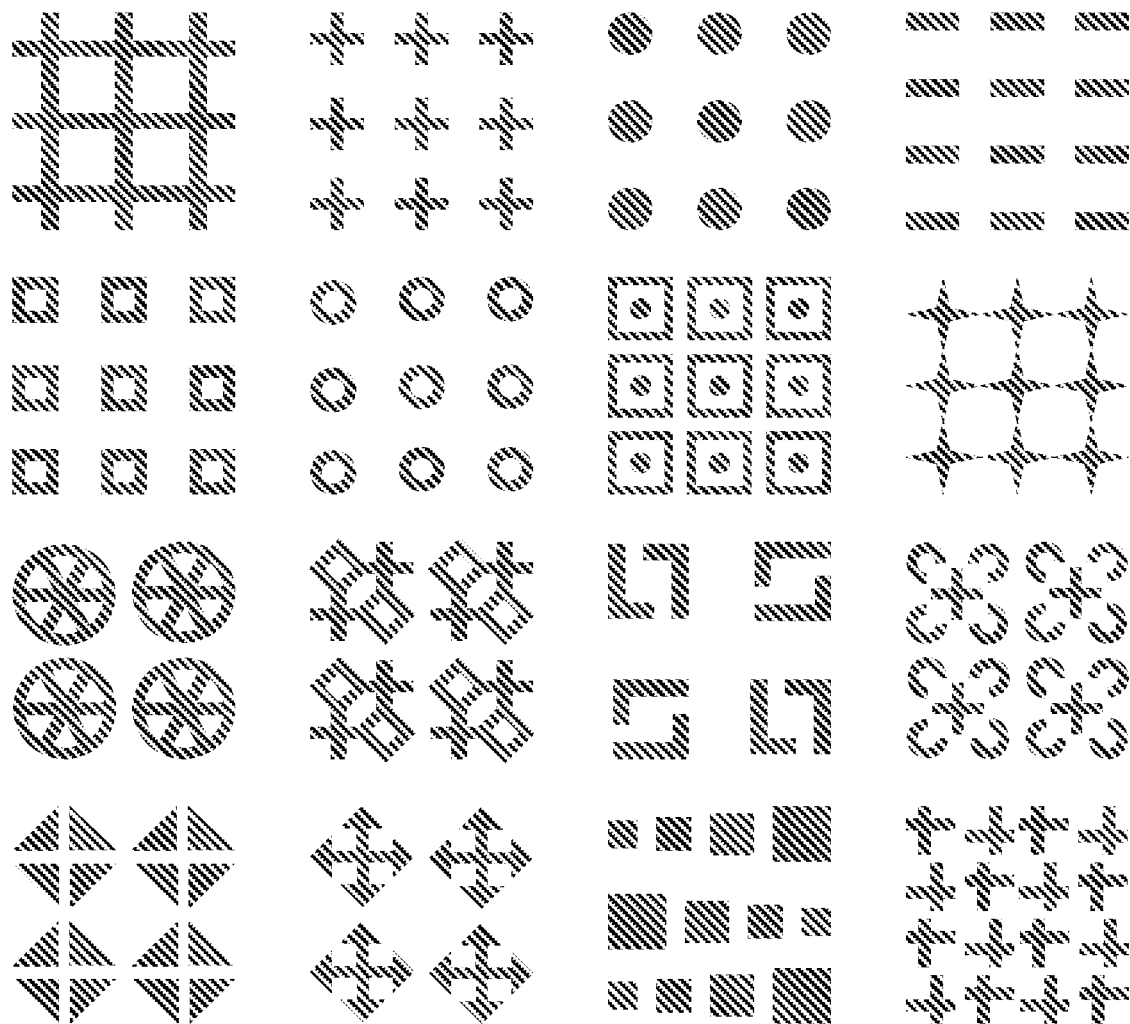
FIG. 2 is a schematic view illustrating a shape of a surface resonator on a metamaterial absorber according to the present disclosure.

The LSPR may be explained with an equivalent circuit model: $\lambda = 2\pi\sqrt{LC/2} \propto w$. L and C respectively represent an equivalent inductance and an equivalent capacitance of a metamaterial absorber, and w represents an effective length of a resonator. A wavelength of the LSPR is positively correlated with the effective length of the resonator. The shape of the resonator includes, but is not limited to, the example shown in FIG. 2. In order to realize the SPR in an LWIR band, the resonator may have a period of 100 nm to 6 µm, a width of 0.1-5 µm, and a thickness of 10 nm to 2 µm.

Embodiment 6 Metamaterial absorber integrated LWIRFPA

Figure 6:
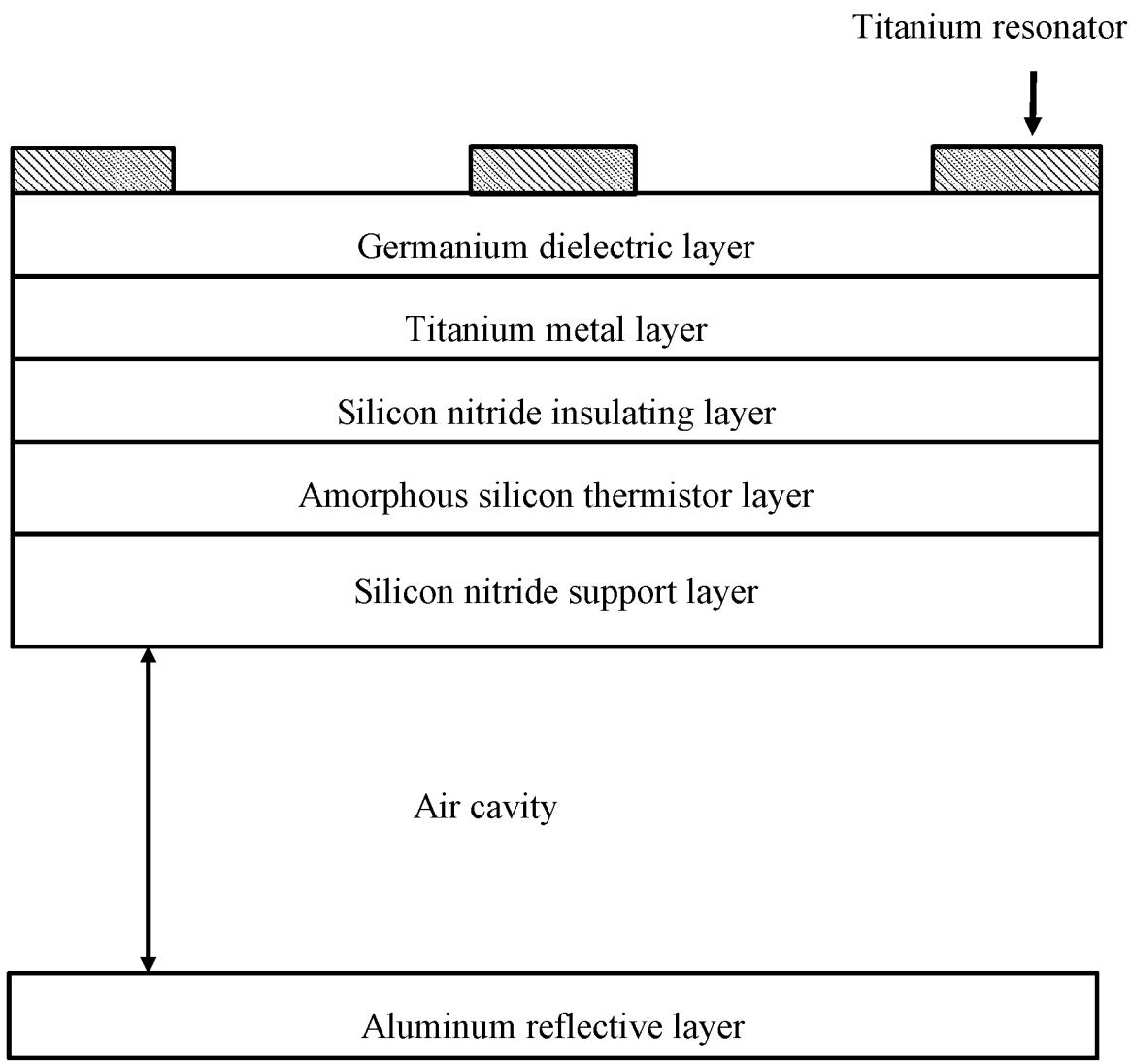
FIG. 6 is a schematic view of Specific Embodiment 6.
Figure 7:
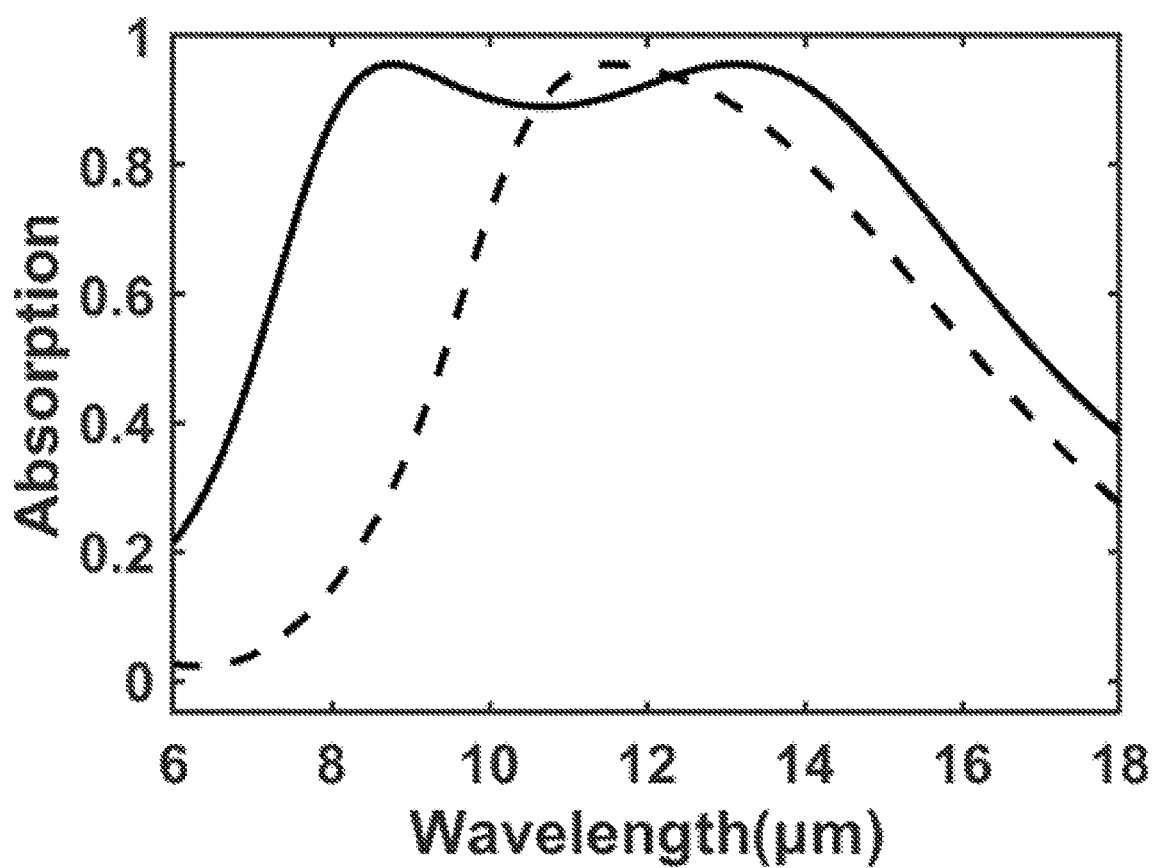
FIG. 7 is an absorption spectrum of Specific Embodiment 6 according to the present disclosure.

FIG. 6 and FIG. 7 show an LWIRFPA in which a metamaterial absorber is directly integrated on a thermistor layer plated with an insulating layer. From top to bottom, the metamaterial absorber integrated LWIRFPA sequentially includes: a cross-shaped titanium resonator layer, a germanium dielectric layer, a titanium metal layer, a silicon nitride insulating layer, an amorphous silicon thermistor layer, and a silicon nitride support layer.

In the embodiment, the resonator layer is 20-1,000 nm thick, the germanium dielectric layer is 10-1,000 nm thick, the titanium metal layer is 10-1,500 nm thick, the silicon nitride insulating layer is 10-100 nm thick, the amorphous silicon thermistor layer is 10-800 nm thick, and the silicon nitride support layer is 10-1,000 nm thick.

A cross-shaped titanium resonator has a period of 0.8-4.4 µm, a length of 0.5-2.5 µm, and a width of 0.05-1 µm.

IR radiation incident on the FPA is coupled with the resonator to excite SPR, and an electric field and a magnetic field of incident light are limited in an absorber. By virtue of reverse currents formed in the titanium resonator layer and the titanium metal layer, energy of the incident light is converted into heat energy in form of an ohmic loss. The heat energy is then conducted to the amorphous silicon thermistor layer through the silicon nitride insulating layer. As a result, there is a resistance change of the thermistor that is finally converted into an electrical signal for readout, thereby completing detection. The metamaterial absorber not only provides broadband incident light to achieve perfect absorption, but also has high photothermal conversion efficiency. Therefore, the FPA has the high detectivity in the wide spectral range.

As shown in FIG. 7, the dotted line represents an absorption spectrum of the FPA without the metamaterial absorber, while the solid line represents an absorption spectrum of the FPA integrated with the metamaterial absorber. Herein, the existing FPA includes a 200-nm silicon nitride absorber layer, a 100-nm amorphous silicon thermistor layer, and a 150-nm silicon nitride support layer. It can be seen that the existing FPA only has one absorption peak at the wavelength of 11.5 µm. Beyond an intrinsic absorption wavelength of silicon nitride, the absorption spectrum is reduced significantly, and the absorptivity at the wavelength of 8 µm is reduced to 10%. Different from single peaked absorption of the original structure, the FPA provided by the present disclosure shows a high absorptivity in the whole LWIR band, and the absorptivity at two SPR absorption peaks is up to 97% or more. At the wavelength of 8 µm, the absorptivity is improved to 90% from less than 10%, and increased by 9 times. In the band of 8-14 µm, the average absorptivity is up to 94% or more.

Embodiment 7 Metamaterial absorber integrated LWIRFPA

Figure 8:
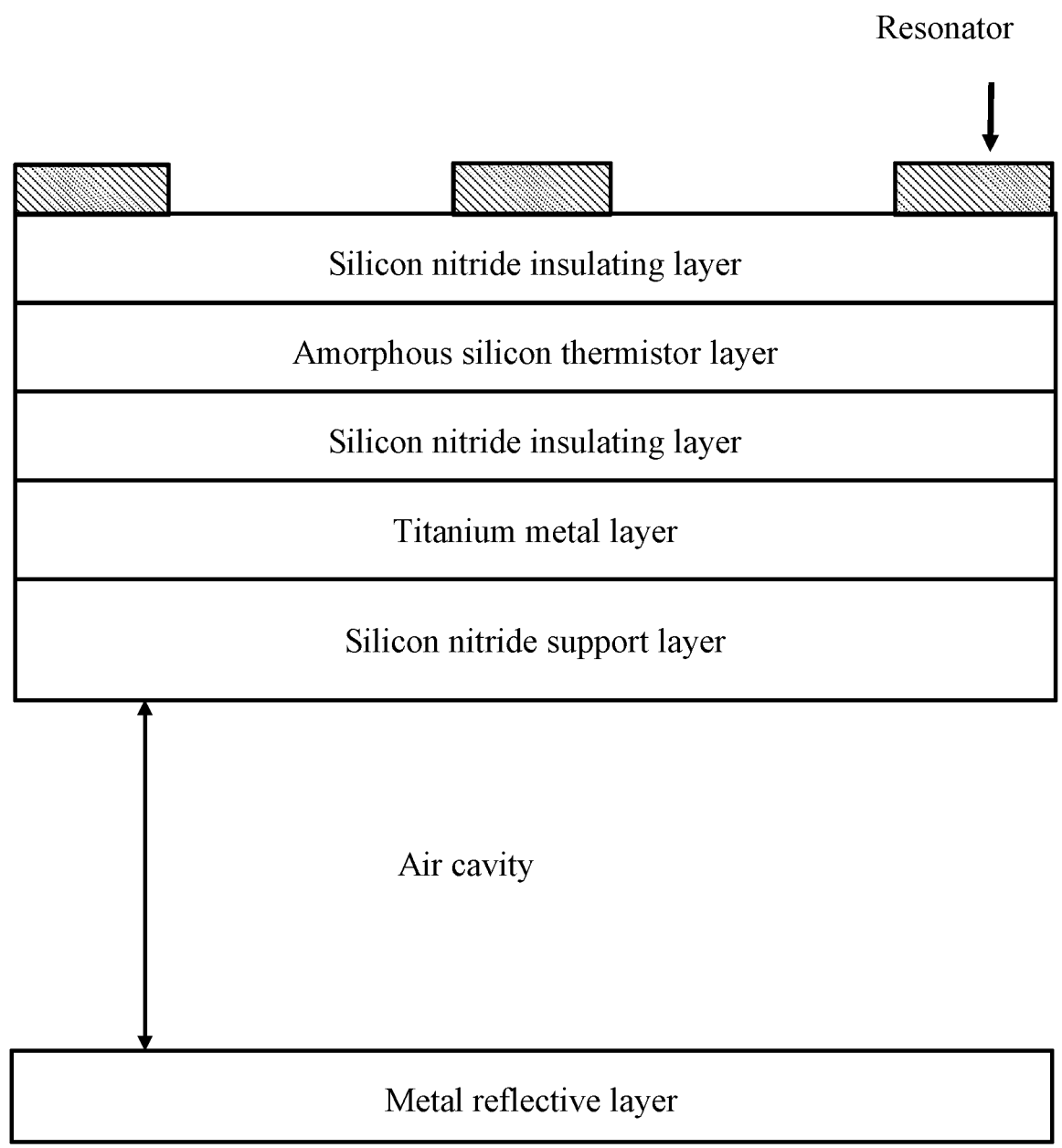
FIG. 8 is a schematic view of Specific Embodiment 7.
Figure 9:
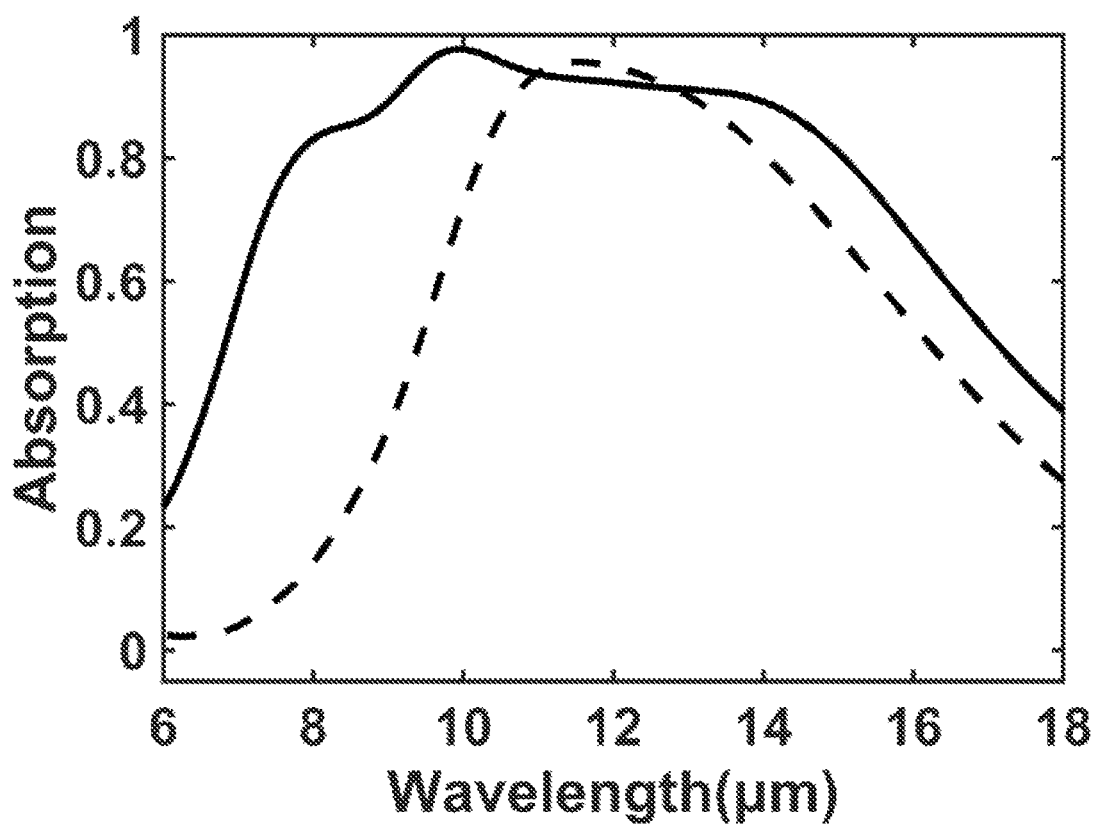
FIG. 9 is an absorption spectrum of Specific Embodiment 7 according to the present disclosure.

FIG. 8 and FIG. 9 show an LWIRFPA in which a thermistor layer serves as a dielectric layer of a metamaterial absorber structure. From top to bottom, the metamaterial absorber integrated LWIRFPA sequentially includes: a cross-shaped titanium resonator layer, a silicon nitride insulating layer, an amorphous silicon thermistor layer, a silicon nitride insulating layer, a titanium metal layer, and a silicon nitride support layer.

In the embodiment, the cross-shaped titanium resonator layer is 50-200 nm thick, the silicon nitride insulating layer is 80-150 nm thick, the amorphous silicon thermistor layer is 60-100 nm thick, the silicon nitride insulating layer is 10-50 nm thick, the titanium metal layer is 10-50 nm thick, and the silicon nitride support layer is 100-200 nm thick.

A cross-shaped titanium resonator has a period of 0.8-3 µm, a length of 1-2 µm, and a width of 0.1-1 µm.

IR radiation incident on the FPA is coupled with the resonator to excite SPR, and an electric field and a magnetic field of incident light are limited in an absorber. By virtue of reverse currents formed in the titanium resonator layer and the titanium metal layer, energy of the incident light is converted into heat energy in form of an ohmic loss. The heat energy is then conducted to the amorphous silicon thermistor layer through the silicon nitride insulating layer. As a result, there is a resistance change of the thermistor that is finally converted into an electrical signal for readout, thereby completing detection.

As shown by the solid line in FIG. 9, the absorption spectrum covers an LWIR band. In the band of 7.5-15 the absorptivity is kept at 80% or more. The average absorptivity beyond the LWIR band is up to 90% or more. At the wavelength of 8 the absorptivity is improved by 8 times or more compared with the existing FPA.

Embodiment 8 Metamaterial absorber integrated LWIRFPA

Figure 10:
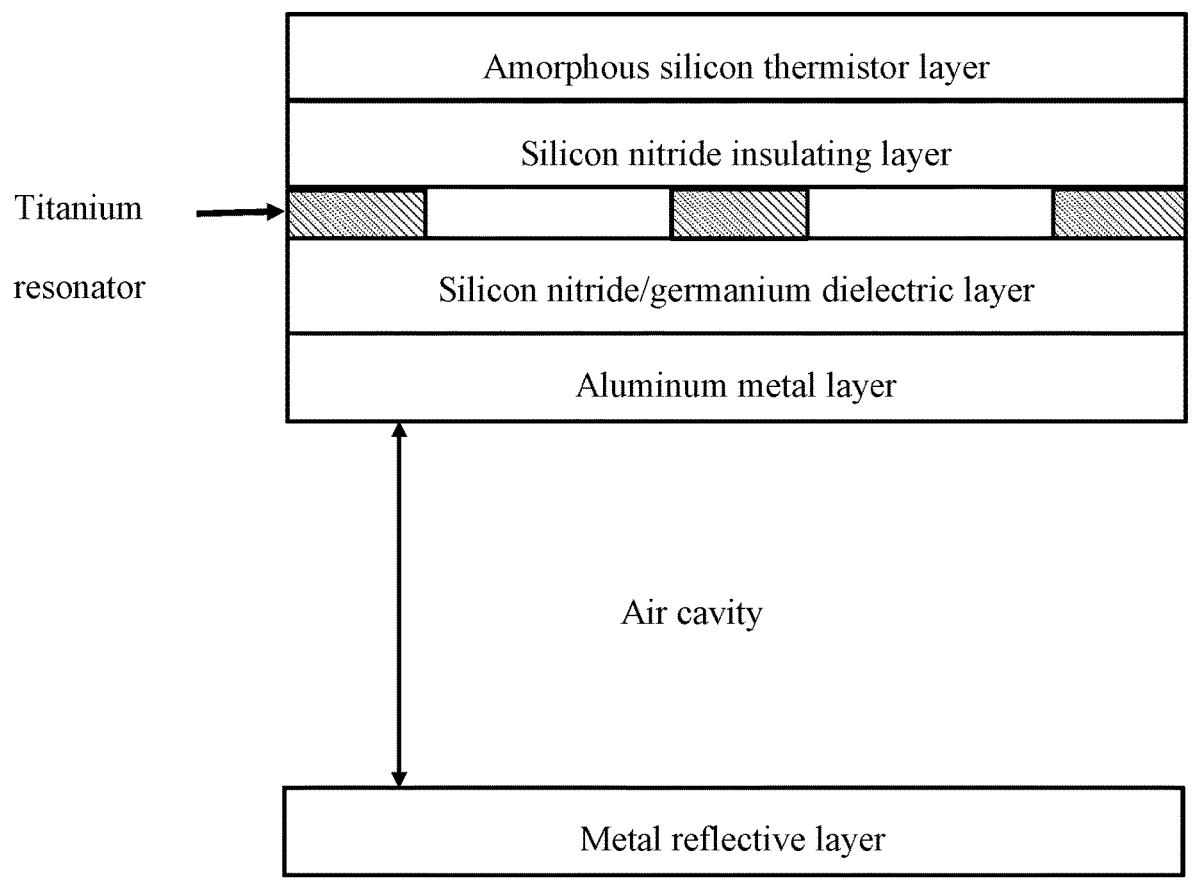
FIG. 10 is a schematic view of Specific Embodiment 8.
Figure 11:
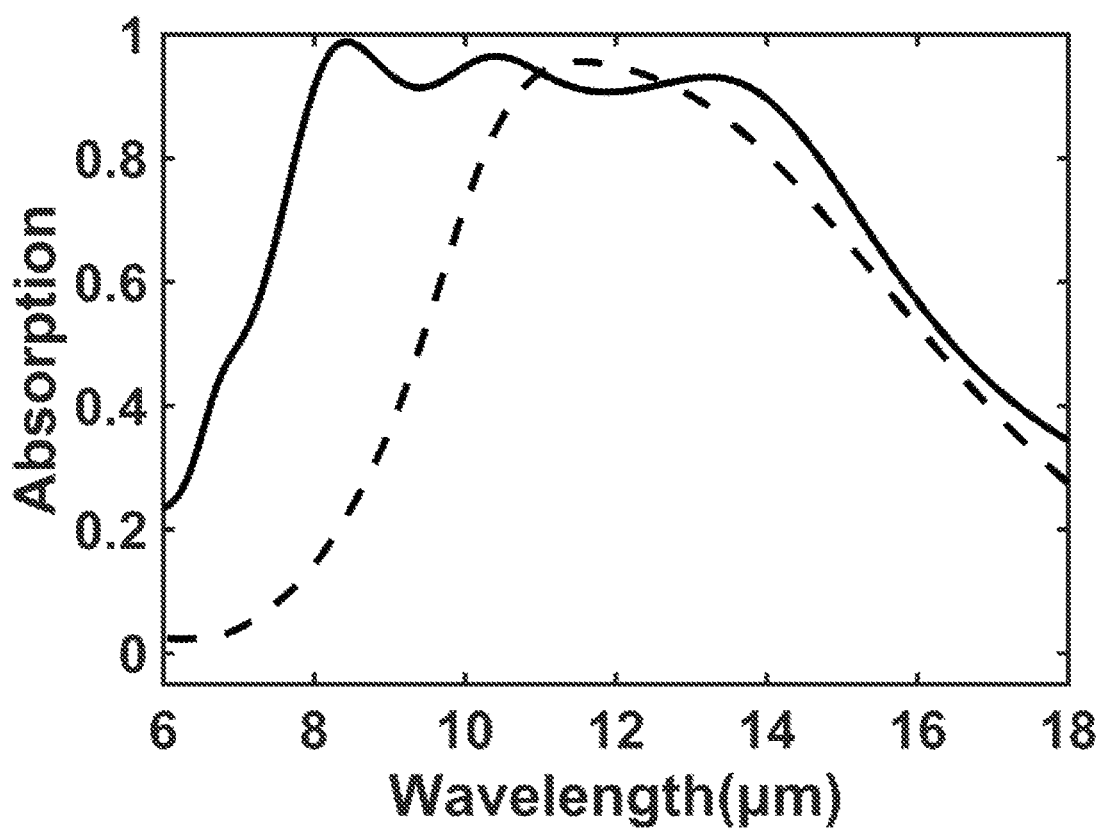
FIG. 11 is an absorption spectrum of Specific Embodiment 8 according to the present disclosure.

FIG. 10 and FIG. 11 show an LWIRFPA in which a thermistor layer is integrated on a metamaterial absorber structure. From top to bottom, the metamaterial absorber integrated LWIRFPA sequentially includes: an amorphous silicon thermistor layer, a silicon nitride insulating layer, a circular titanium resonator layer, a silicon nitride/germanium dielectric layer, and an aluminum metal layer.

In the embodiment, the amorphous silicon thermistor layer is 60-100 nm thick, the silicon nitride insulating layer is 10-50 nm thick, the titanium resonator layer is 50-80 nm thick, the silicon nitride/germanium dielectric layer is 100-600 nm thick thick, and the aluminum metal layer is 10-50 nm thick.

A circular titanium resonator has a period of 1.2-4 and a diameter of 0.4-3 µm.

IR radiation incident on the FPA is transmitted through the amorphous silicon thermistor layer. A minority of the IR radiation is absorbed by the silicon nitride insulating layer, and a majority of the IR radiation is incident on a surface of the titanium resonator to excite SPR. Energy of incident light is absorbed by the metamaterial absorber composed of the circular titanium resonator layer, the silicon nitride/germanium dielectric layer and the aluminum metal layer, and converted into heat energy. The heat energy is then conducted to the amorphous silicon thermistor layer through the silicon nitride insulating layer. As a result, there is a resistance change of the thermistor that is finally converted into an electrical signal for readout, thereby completing detection.

As shown by the solid line in FIG. 11, in the band of 8-14 the absorptivity is kept at 90% or more, and the average absorptivity is up to 94%. At the wavelength of 8 the absorptivity is improved by 9 times or more compared with the existing FPA.

What is claimed is:

1. A metamaterial absorber integrated long-wave infrared focal plane array (LWIRFPA) comprising: a resonator layer, a dielectric layer, and a metal layer, wherein
   the resonator layer is of a sub-wavelength periodic resonator array structure, generates surface plasmon resonance (SPR), and is made of a metal or metalloid material;
   wherein the SPR refers to propagating surface plasmon resonance (PSPR) or localized surface plasmon resonance (LSPR); the PSPR is controlled by a structure period, with a change rule satisfying:

$$k_{SP} = k_0 \sin\theta + i \times \frac{2\pi}{P}$$

wherein $$k_{SP} = \frac{2\pi}{\lambda},$$

namely µ∝P; and a wavelength of the PSPR increases a red shift with the structure period; and
   the LSPR is explained with an equivalent circuit model:

$$\lambda = 2\pi\sqrt{LC/2} \propto w$$

wherein L and C respectively represent an equivalent inductance and an equivalent capacitance of a metamaterial absorber, and w represents an effective length of a resonator; and a wavelength of the LSPR is positively correlated with the effective length of the resonator.

2. The metamaterial absorber integrated LWIRFPA according to claim 1, wherein the resonator layer is composed of a surface graphical sub-wavelength periodic metal resonator array.

3. The metamaterial absorber integrated LWIRFPA according to claim 2, wherein the dielectric layer is a thermistor layer or a dielectric layer.

4. The metamaterial absorber integrated LWIRFPA according to claim 1, further comprising: a thermistor layer and/or an absorber layer.

5. The metamaterial absorber integrated LWIRFPA according to claim 3, wherein an air cavity is further provided under the metamaterial absorber integrated LWIRFPA.

6. The metamaterial absorber integrated LWIRFPA according to claim 4, wherein a metal reflective layer is provided under the air cavity.

7. The metamaterial absorber integrated LWIRFPA according to claim 4, wherein the LWIRFPA refers to an FPA in which a metamaterial absorber is directly integrated on a thermistor layer plated with an insulating layer, and from top to bottom, the metamaterial absorber integrated LWIRFPA sequentially comprises: a cross-shaped titanium resonator layer, a germanium dielectric layer, a titanium metal layer, a silicon nitride insulating layer, an amorphous silicon thermistor layer, and a silicon nitride support layer; the resonator layer is 20-1,000 nm thick, the germanium dielectric layer is 10-1,000 nm thick, the titanium metal layer is 10-1,500 nm thick, the silicon nitride insulating layer is 10-100 nm thick, the amorphous silicon thermistor layer is 10-800 nm thick, and the silicon nitride support layer is 10-1,000 nm thick; and a cross-shaped titanium resonator has a period of 0.8-4.4 μm, a length of 0.5-2.5 μm, and a width of 0.05-1 μm.

8. The metamaterial absorber integrated LWIRFPA according to claim 4, wherein the LWIRFPA refers to an FPA in which a thermistor layer serves as a dielectric layer of a metamaterial absorber structure, and from top to bottom, the metamaterial absorber integrated LWIRFPA sequentially comprises: a cross-shaped titanium resonator layer, a silicon nitride insulating layer, an amorphous silicon thermistor layer, a silicon nitride insulating layer, a titanium metal layer, and a silicon nitride support layer; the cross-shaped titanium resonator layer is 50-200 nm thick, the silicon nitride insulating layer is 80-150 nm thick, the amorphous silicon thermistor layer is 60-100 nm thick, the silicon nitride insulating layer is 10-50 nm thick, the titanium metal layer is 10-50 nm thick, and the silicon nitride support layer is 100-200 nm thick; and a cross-shaped titanium resonator has a period of 0.8-3 a length of 1-2 and a width of 0.1-1 μm.

9. The metamaterial absorber integrated LWIRFPA according to claim 4, wherein from top to bottom, the metamaterial absorber integrated LWIRFPA sequentially comprises: an amorphous silicon thermistor layer, a silicon nitride insulating layer, a circular titanium resonator layer, a silicon nitride/germanium compound dielectric layer, and an aluminum metal layer; the amorphous silicon thermistor layer is 60-100 nm thick, the silicon nitride insulating layer is 10-50 nm thick, the titanium resonator layer is 50-80 nm thick, the silicon nitride/germanium dielectric layer is 100-600 nm thick, and the aluminum metal layer is 10-50 nm thick; and a circular titanium resonator has a period of 1.2-4 and a diameter of 0.4-3 μm.

* * * * *